US011841119B2

(12) United States Patent
Song

(10) Patent No.: US 11,841,119 B2
(45) Date of Patent: Dec. 12, 2023

(54) LAMP FOR VEHICLE

(71) Applicant: HYUNDAI MOBIS CO., LTD., Seoul (KR)

(72) Inventor: Ki Ryong Song, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 17/864,643

(22) Filed: Jul. 14, 2022

(65) Prior Publication Data

US 2023/0144013 A1 May 11, 2023

(30) Foreign Application Priority Data

Nov. 8, 2021 (KR) .................. 10-2021-0152500

(51) Int. Cl.
*F21S 41/148* (2018.01)
*F21S 41/20* (2018.01)
*F21Y 115/10* (2016.01)
*F21S 43/14* (2018.01)

(52) U.S. Cl.
CPC ........... *F21S 41/148* (2018.01); *F21S 41/285* (2018.01); *F21S 43/14* (2018.01); *F21Y 2115/10* (2016.08)

(58) Field of Classification Search
CPC ............................. F21S 41/148; F21S 41/285
See application file for complete search history.

(56) References Cited

U.S. PATENT DOCUMENTS

| | | | | |
|---|---|---|---|---|
| 2002/0071267 A1* | 6/2002 | Lekson | ................ | B60Q 1/302 |
| | | | | 362/23.17 |
| 2011/0128750 A1* | 6/2011 | Nakada | ................ | F21S 43/40 |
| | | | | 362/518 |
| 2011/0216549 A1* | 9/2011 | Futami | ................ | B60Q 1/0041 |
| | | | | 362/520 |
| 2016/0347246 A1* | 12/2016 | Fujita | ................ | G02B 6/0036 |
| 2018/0126899 A1* | 5/2018 | Bayersdorfer | ....... | G02B 6/0036 |
| 2018/0218713 A1* | 8/2018 | Kusanagi | ................ | G06T 11/60 |

* cited by examiner

*Primary Examiner* — Christopher E Dunay
(74) *Attorney, Agent, or Firm* — NovoTechIP International PLLC

(57) ABSTRACT

Disclosed is a lamp for a vehicle. The lamp for a vehicle includes a light source part, and a lens part that outputs light input from the light source part to a front side, and having a three-dimensional pattern having a specific pattern shape, the lens part outputs the light input from the light source part to the front side when the light reaches the three-dimensional pattern, and the three-dimensional pattern is patterned such that a lighting image generated by the light output to the front side of the lens part is implemented as a three-dimensional image.

16 Claims, 15 Drawing Sheets

LAMP FOR VEHICLE

CROSS-REFERENCE TO RELATED APPLICATIONS

This application claims the benefit of priority to Korean Patent Application No. 10-2021-0152500, filed in the Korean Intellectual Property Office on Nov. 8, 2021, the entire content of which is incorporated herein by reference.

BACKGROUND

1. Technical Field

The present disclosure relates to a lamp for a vehicle, and more particularly, to a lamp for a vehicle that may implement a three-dimensional image.

2. Discussion of Related Art

In general, a vehicle includes various kinds of lamps having a lighting function for allowing a user to easily identify an object located around a vehicle during nighttime driving and a signal function for informing other vehicles or road users of a driving state of the vehicle. For example, turn signal lamps, tail lamps, brake lamps, side markers, and the like are signal lamps mainly for signal functions.

To secure a design distinction and an aesthetic aspect of a lamp for a vehicle, various technologies for differentiating an image of a signal lamp are applied. According to a conventional technology, to implement a three-dimensional lighting image of a lamp for a vehicle, methods that use a lenticular lens, in which a film is laminated, a hologram technology, an optical fiber, a bezel, and the like are used.

However, the conventional technology requires a separate light source and a separate medium, such as a lens film, and thus manufacturing costs and the number of components may increase. Accordingly, it is necessary to improve a technology for enhancing a product value of a lamp and decreasing material costs and the number of components by implementing a three-dimensional lighting image.

SUMMARY

The present disclosure has been made to solve the above-mentioned problems occurring in the prior art while advantages achieved by the prior art are maintained intact.

An aspect of the present disclosure provides a lamp for a vehicle that implements a lighting image as a three-dimensional image while not using a separate special light source, lens, or film.

Another aspect of the present disclosure provides a lamp for a vehicle that enhances a product value of a product and decreases manufacturing costs and the number of components by implementing various differentiated three-dimensional images.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle includes a light source part, and a lens part that outputs light input from the light source part to a front side, and having a three-dimensional pattern having a specific pattern shape, the lens part outputs the light input from the light source part to the front side when the light reaches the three-dimensional pattern, and the three-dimensional pattern is patterned such that a lighting image generated by the light output to the front side of the lens part is implemented as a three-dimensional image.

The three-dimensional pattern may be designed to have a shape having at least one vanishing point when viewed from the front side to give a perspective to the lighting image.

The lens part may include a lens body, an input surface formed on one side of the lens body, and to which the light from the light source part is input, a front surface formed on a front side of the lens body, and a rear surface formed on a rear side of the lens body, and the three-dimensional pattern may be formed on at least one of an interior of the lens body, the front surface, and the rear surface.

The lens part may output the light input to the lens body from an area, in which the three-dimensional pattern is formed, to the front side through the front surface, and may totally reflect the light in areas of the front surface and the rear surface, except for areas in which the three-dimensional pattern is formed.

The front surface may include a light outputting area corresponding to the area, in which the three-dimensional pattern is formed, and that outputs the light, and a reflection area that totally reflects the light to an area other than the light outputting area.

The three-dimensional pattern may include a plurality of unit patterns, and at least one of depths and widths of the plurality of unit patterns may be formed to be different.

The three-dimensional pattern may be formed on the front surface to be engraved or embossed.

The three-dimensional pattern may be formed on the rear surface to be engraved or embossed, and the three-dimensional pattern formed on the rear surface may be formed to overlap or miss the three-dimensional pattern formed on the front surface when viewed from the front side.

The three-dimensional pattern may include a plurality of unit patterns, and the plurality of unit patterns may be stepped as it goes from a central area to a peripheral area of the lens body, be recessed concavely toward the rear side as it goes toward the central area, or protrude convexly toward the front side as it goes toward the central area.

The three-dimensional pattern may be formed by an empty space defined in the interior of the lens body, and includes a plurality of unit patterns.

The plurality of unit patterns may be formed at different locations with respect to a thickness direction that faces the rear surface from the front surface of the lens body.

The plurality of unit patterns may be formed at a location that is closer to the front surface as it goes from the central area to the peripheral area of the lens body, or formed at a location that is closer to the rear surface as it goes from the central area to the peripheral area of the lens body.

A plurality of lens bodies may be provided, the plurality of lens bodies may be arranged in a direction that faces the front side, and the light source part may individually irradiate light toward the plurality of lens bodies.

The plurality of lens bodies may be disposed to overlap each other when viewed from the front side.

The plurality of lens bodies may be disposed to be spaced apart from each other, and adjacent ones of the plurality of lens bodies may be disposed such that some areas thereof overlap each other when viewed from the front side.

The input surface may be formed on a side surface of the lens body, which is a surface in a direction that is perpendicular to a direction that faces the front side, and the light source part may include a plurality of light sources, and is disposed in a lateral direction of the lens body to irradiate the light toward the input surface.

The light source part may further include a light guide that guides the light irradiated by the plurality of light sources to the lens part.

The light source part may further include condensing lenses disposed between the plurality of light sources and the lens part.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

First, the embodiments described herein are embodiments that are suitable for understanding the technical features of a lamp for a vehicle according to the present disclosure. However, the present disclosure is not limited to the embodiment described below or the technical features of the present disclosure are not limited by the described embodiments, and the present disclosure may be variously modified without departing from the technical scope of the present disclosure.

Figure 1:
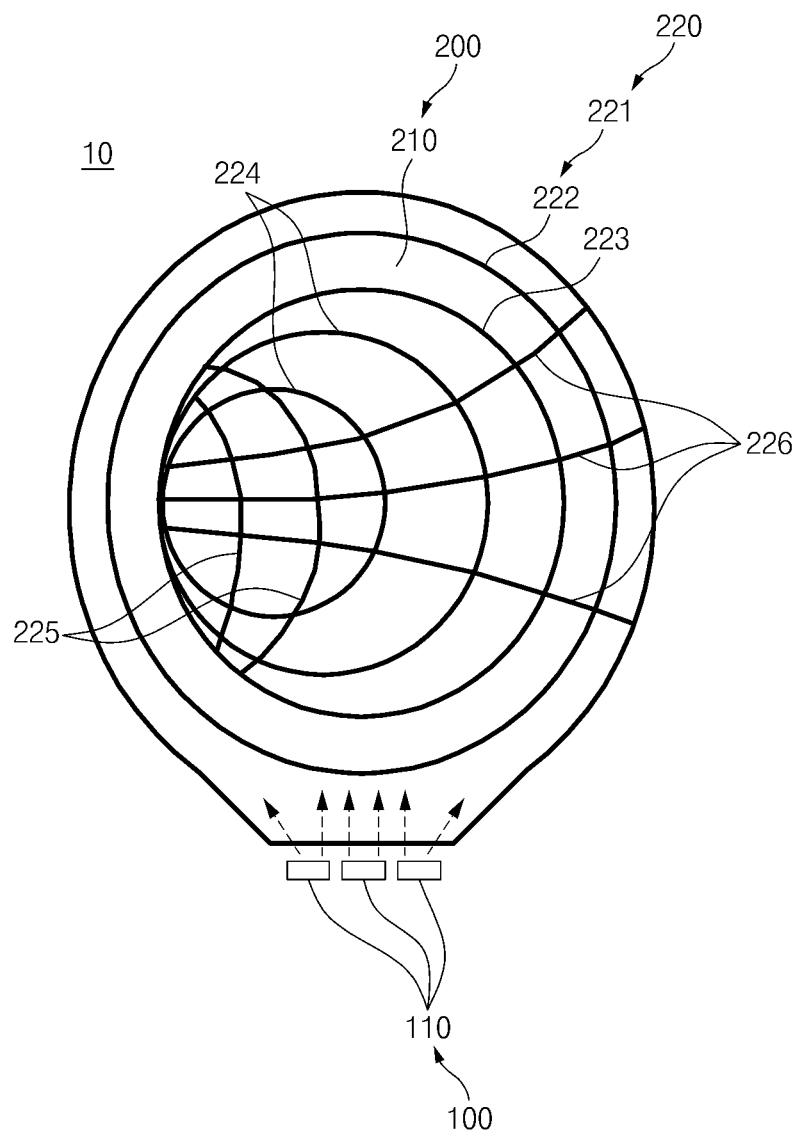
FIG. 1 is a View illustrating a front surface of a lamp for a vehicle according to an embodiment of the present disclosure.
Figure 2A:
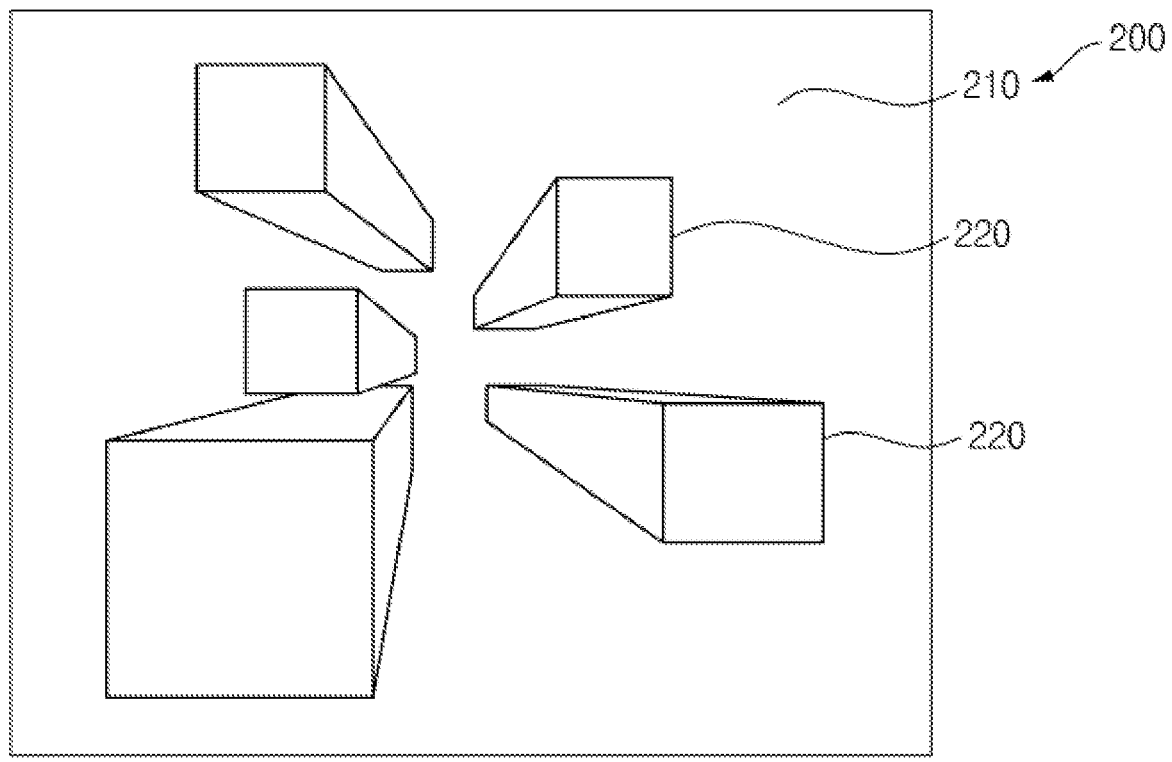
FIGS. 2A and 2B illustrate a front surface of a lens part according to an embodiment of the present disclosure, and are views illustrating an example of a three-dimensional (3D) pattern using a vanishing point.
Figure 2B:
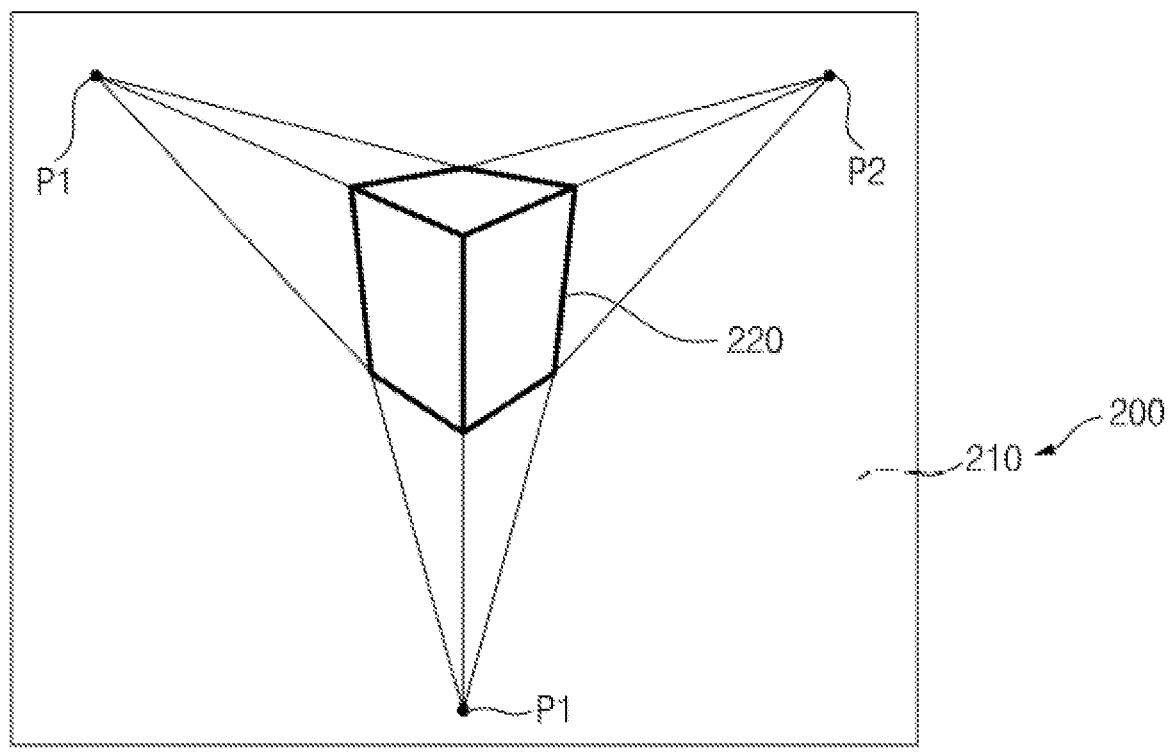
Figure 3:
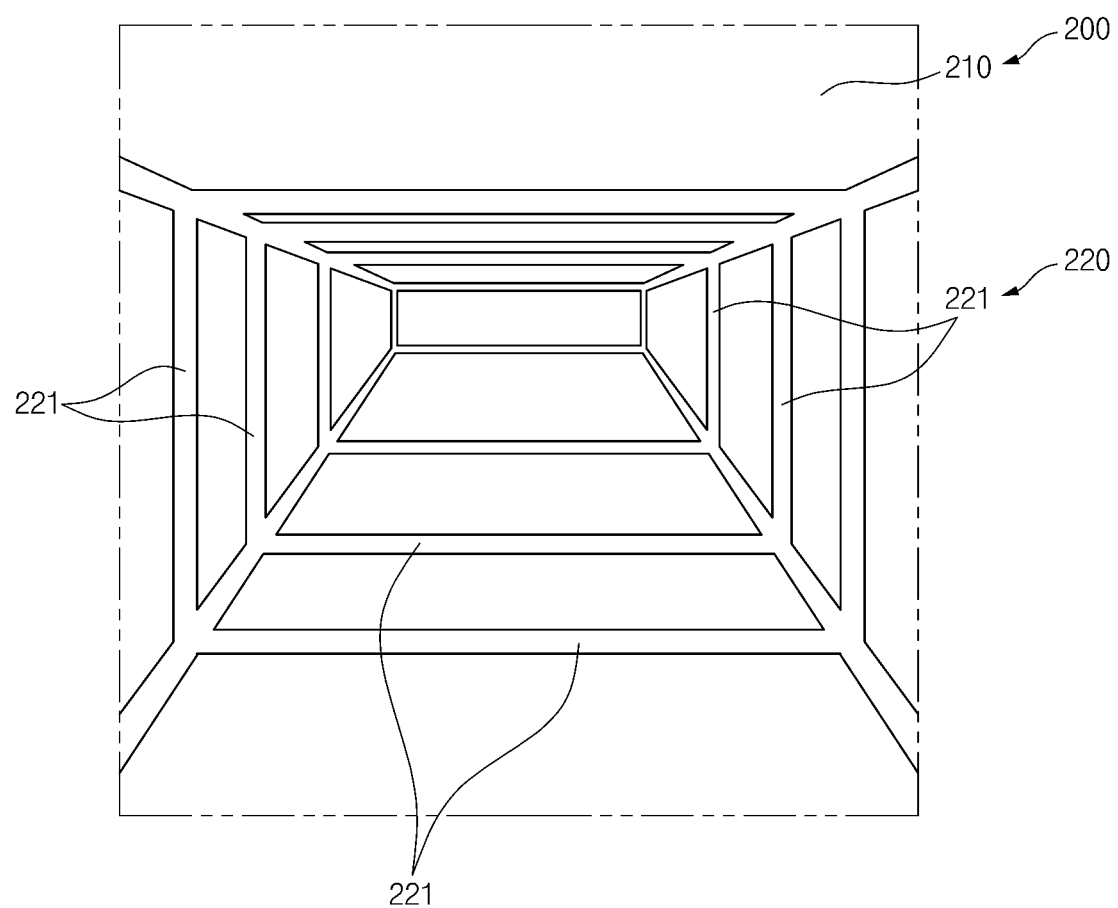
FIG. 3 illustrates a front surface of a lens part according to an embodiment of the present disclosure, and is a view illustrating another example of a 3D pattern.
Figure 4:
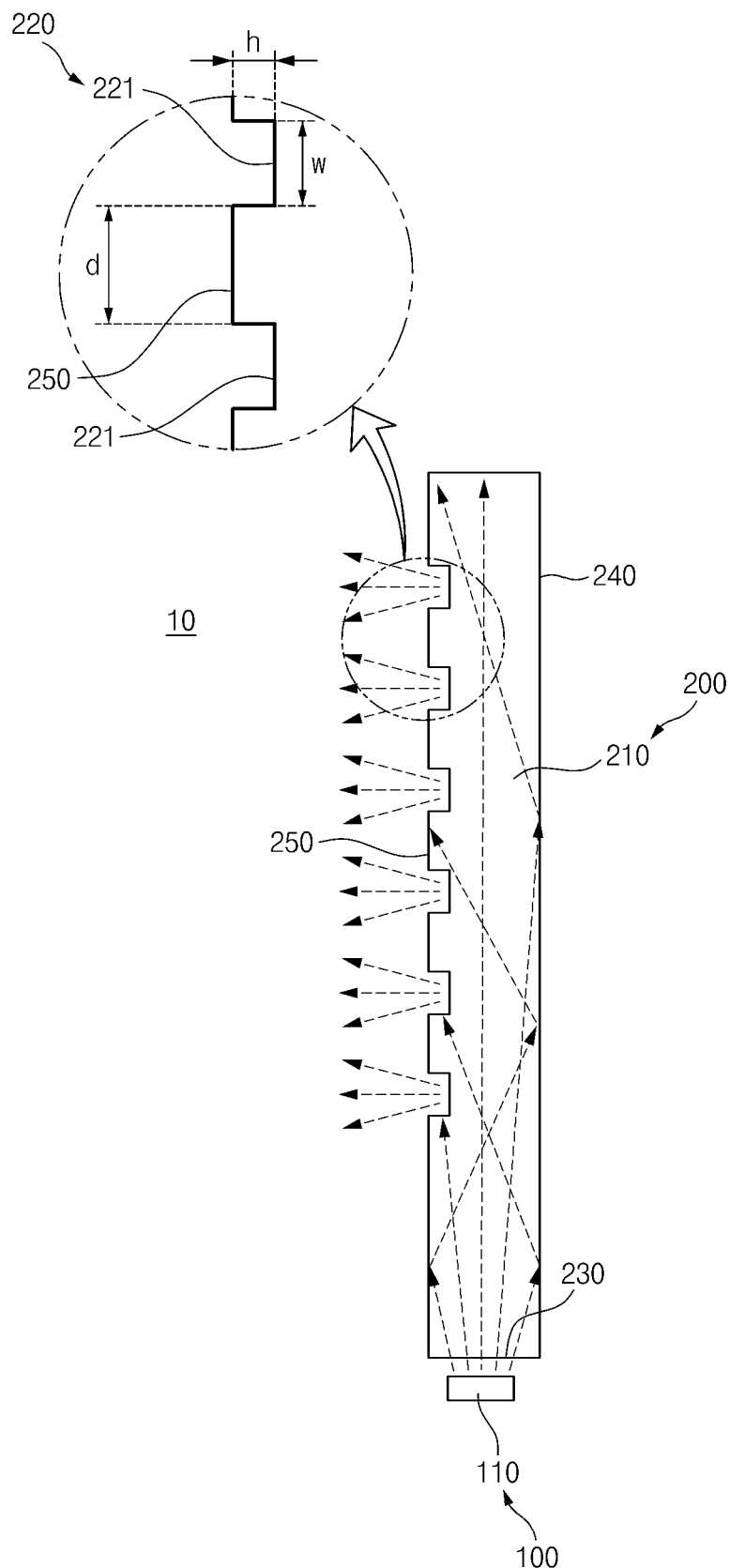
FIG. 4 illustrates a side surface of a lamp for a vehicle according to an embodiment of the present disclosure, and is a view illustrating an example, in which a 3D pattern is formed on a front surface of a lens part.
Figure 5:
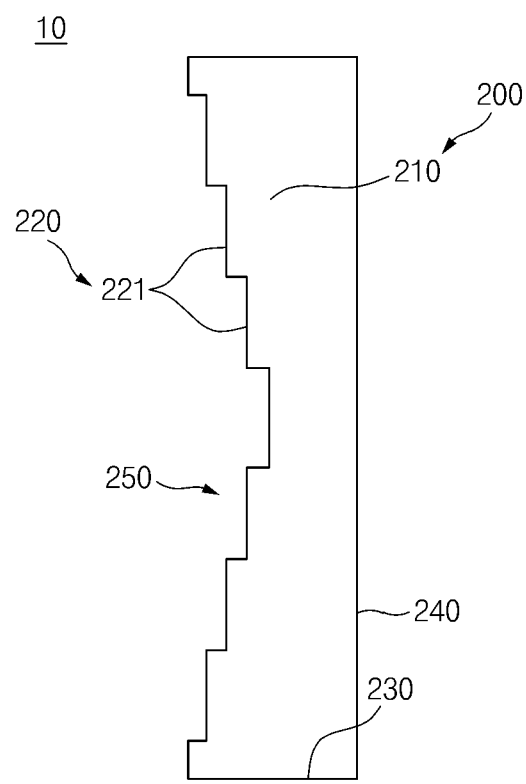
FIG. 5 illustrates a modification of a lens part of a lamp for a vehicle illustrated in FIG. 4, and is a view illustrating an example, in which a 3D pattern is formed on a front surface to be stepped to have a concave shape.
Figure 6:
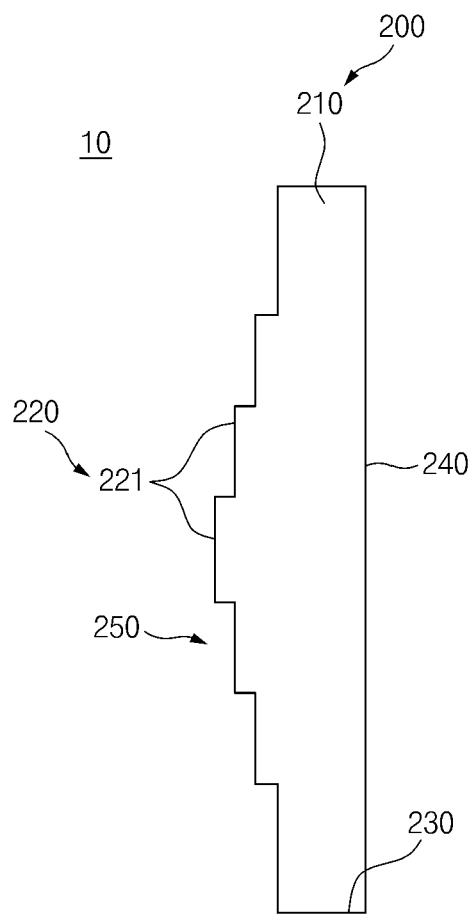
FIG. 6 illustrates another modification of a lens part of a lamp for a vehicle illustrated in FIG. 4, and is a view illustrating an example, in which a 3D pattern is formed on a front surface to be stepped to have a convex shape.
Figure 7:
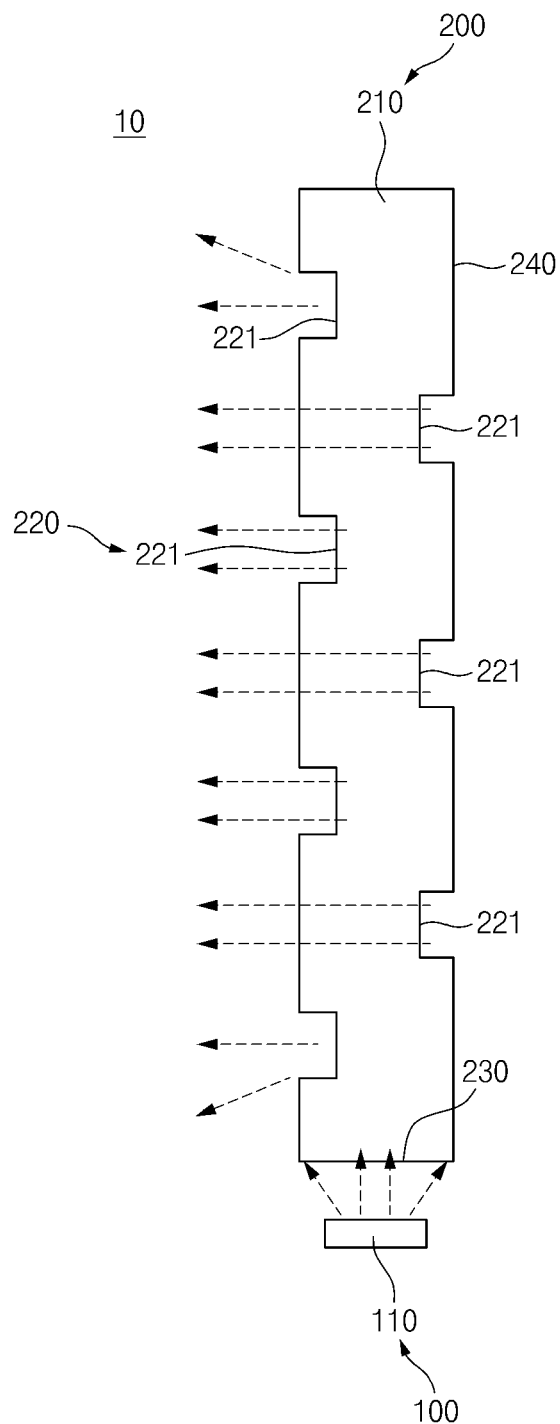
FIG. 7 illustrates another modification of a lens part of a lamp for a vehicle illustrated in FIG. 4, and is a view illustrating an example, in which a 3D pattern is formed on a front surface and a rear surface.
Figure 8:
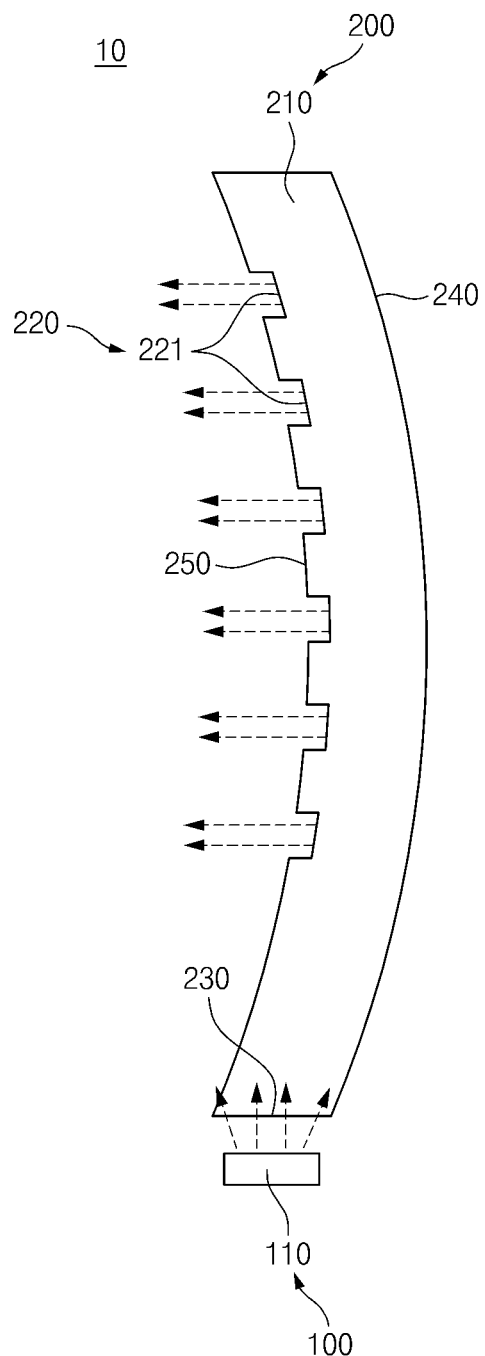
FIG. 8 illustrates another modification of a lamp for a vehicle illustrated in FIG. 4, and is a view illustrating an example, in which a lens body is formed concavely.

FIG. 1 is a View illustrating a front surface of a lamp for a vehicle according to an embodiment of the present disclosure. FIGS. 2A and 2B illustrate a front surface of a lens part according to an embodiment of the present disclosure, and are views illustrating an example of a three-dimensional (3D) pattern using a vanishing point. FIG. 3 illustrates a front surface of a lens part according to an embodiment of the present disclosure, and is a view illustrating another example of a 3D pattern. FIG. 4 illustrates a side surface of a lamp for a vehicle according to an embodiment of the present disclosure, and is a view illustrating an example, in which a 3D pattern is formed on (i.e., disposed at) a front surface of a lens part. FIG. 5 illustrates a modification of a lens part of a lamp for a vehicle illustrated in FIG. 4, and is a view illustrating an example, in which a 3D pattern is formed on a front surface to be stepped to have a concave shape. FIG. 6 illustrates another modification of a lens part of a lamp for a vehicle illustrated in FIG. 4, and is a view illustrating an example, in which a 3D pattern is formed on a front surface to be stepped to have a convex shape. FIG. 7 illustrates another modification of a lens part of a lamp for a vehicle illustrated in FIG. 4, and is a view illustrating an example, in which a 3D pattern is formed on a front surface and a rear surface. FIG. 8 illustrates another modification of a lamp for a vehicle illustrated in FIG. 4, and is a view illustrating an example, in which a lens body is formed concavely.

Figure 9:
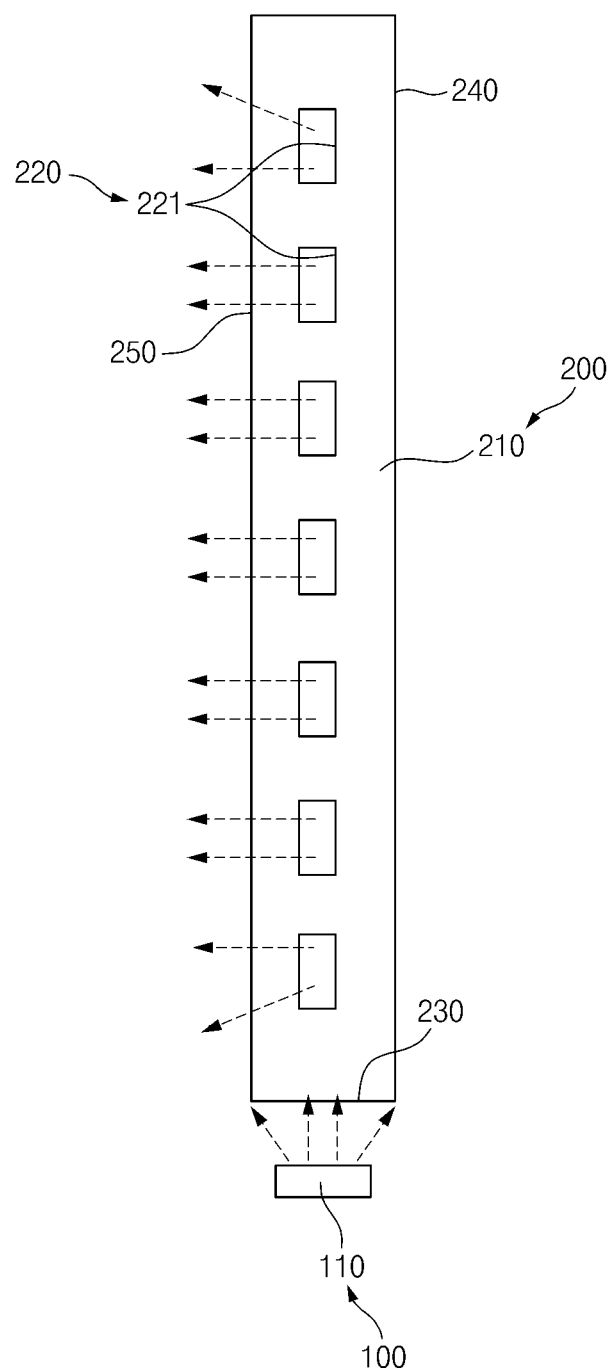
FIG. 9 illustrates a lamp for a vehicle according to another embodiment of the present disclosure, and is a view illustrating an example, in which a 3D pattern is formed in an interior of a lens part.
Figure 10:
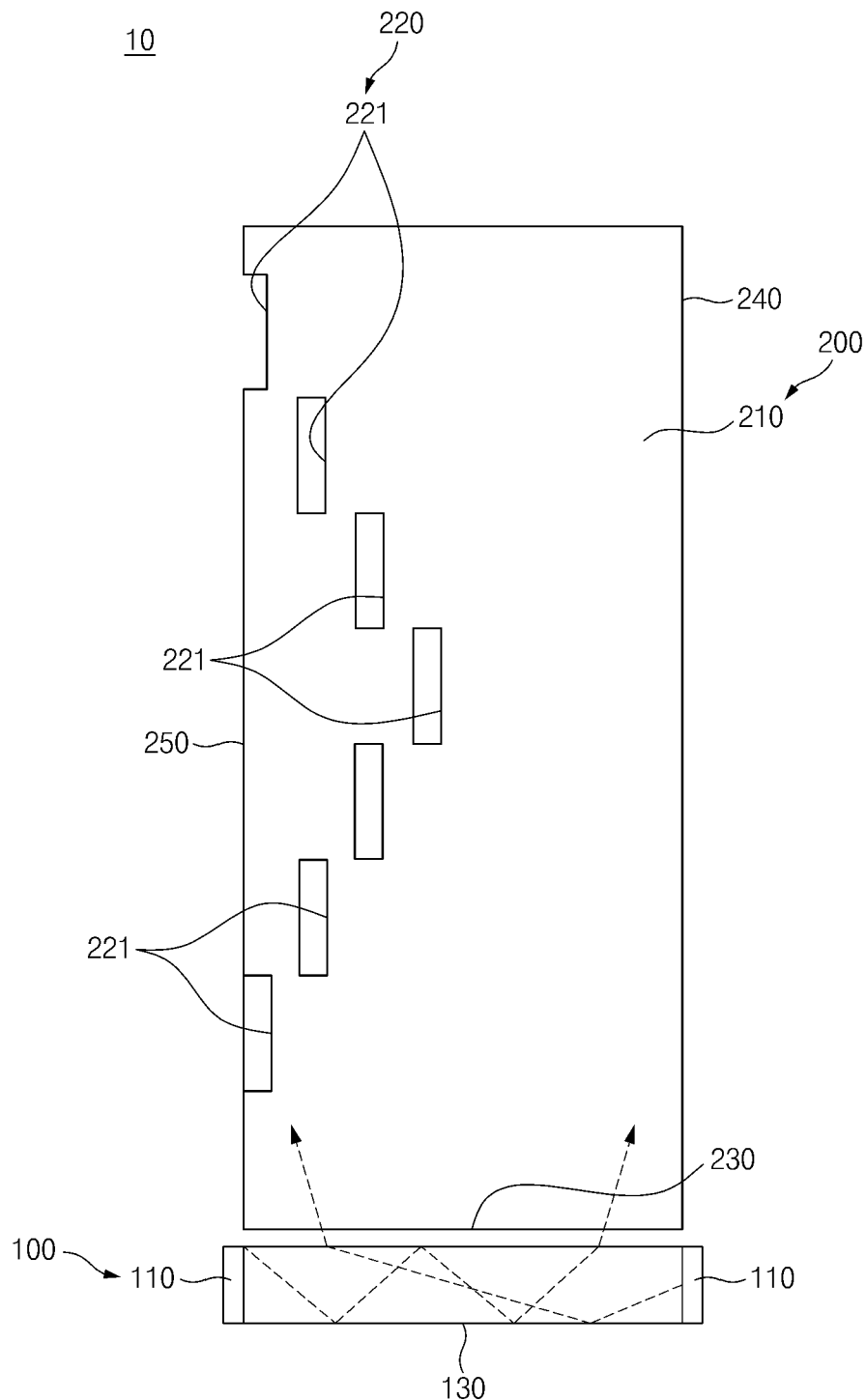
FIG. 10 is a modification of a lamp for a vehicle illustrated in FIG. 9, and is a view illustrating an example, in which locations of a 3D pattern formed in an interior of a lens part in a thickness direction are different.
Figure 11:
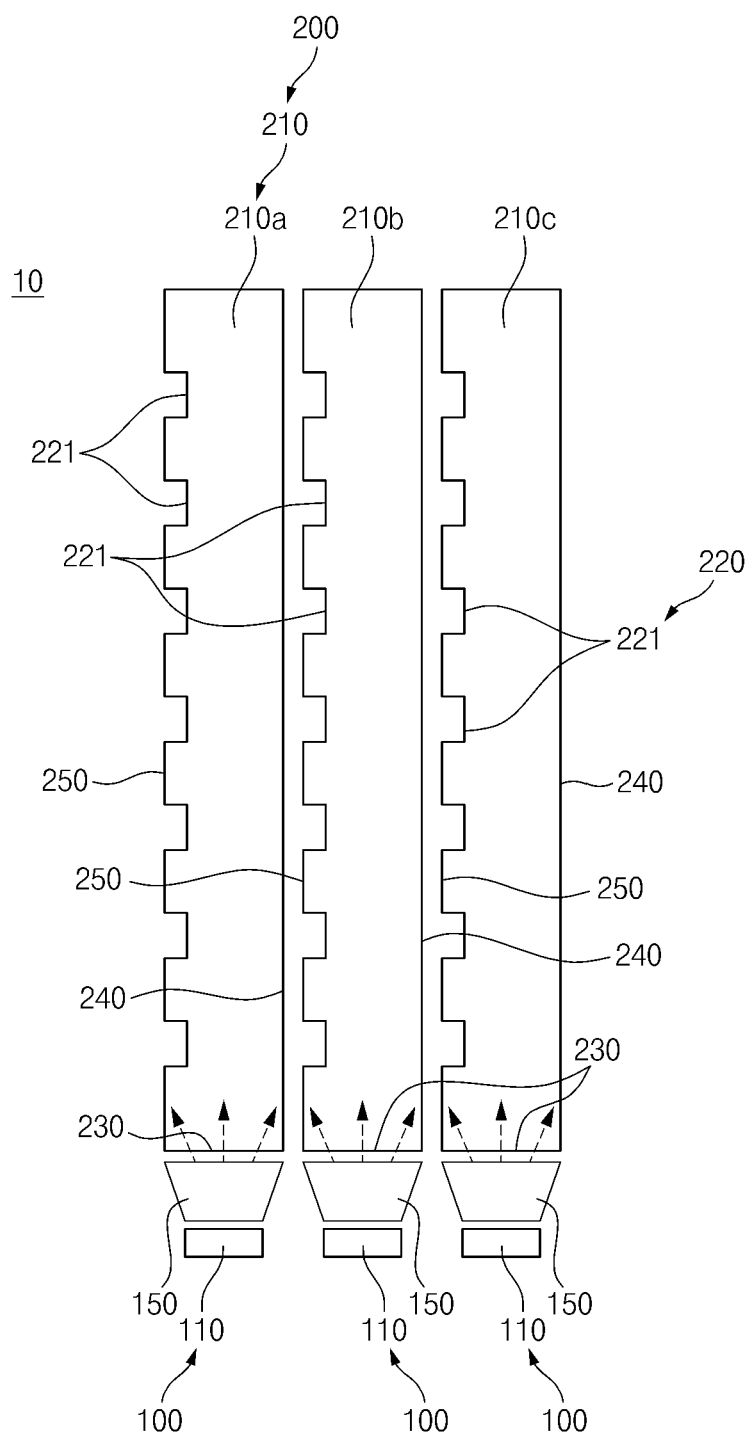
FIG. 11 illustrates a lamp for a vehicle according to another embodiment of the present disclosure, and is a view illustrating an example, in which a plurality of lens bodies overlap each other.
Figure 12:
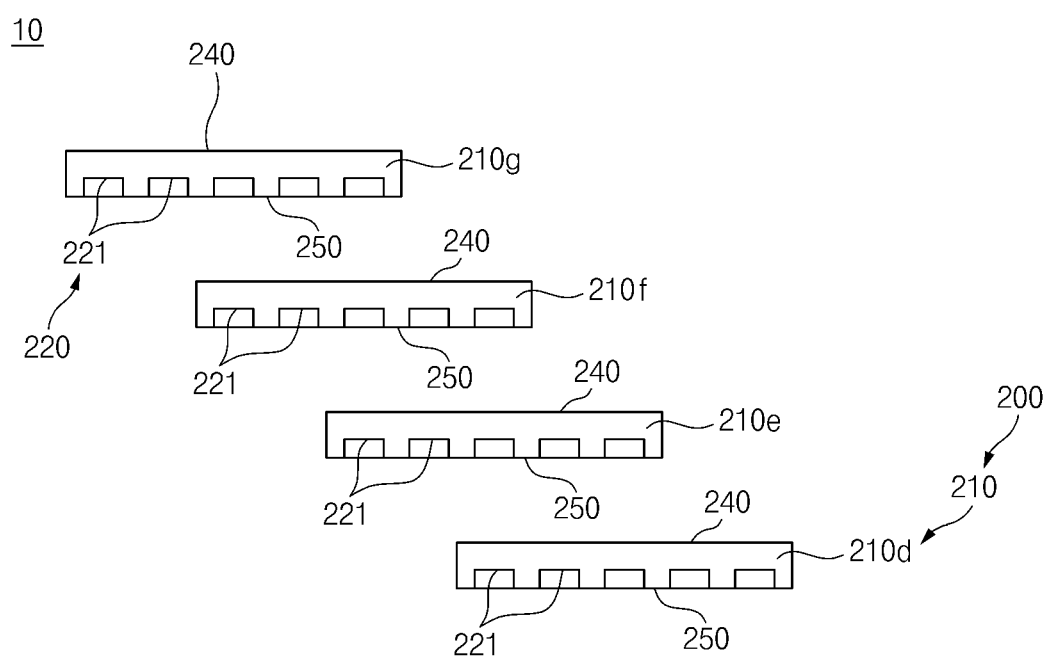
FIG. 12 is a modification of a lamp for a vehicle illustrated in FIG. 11, and is a view illustrating an example, in which a plurality of lens bodies are disposed to miss each other.
Figure 13:
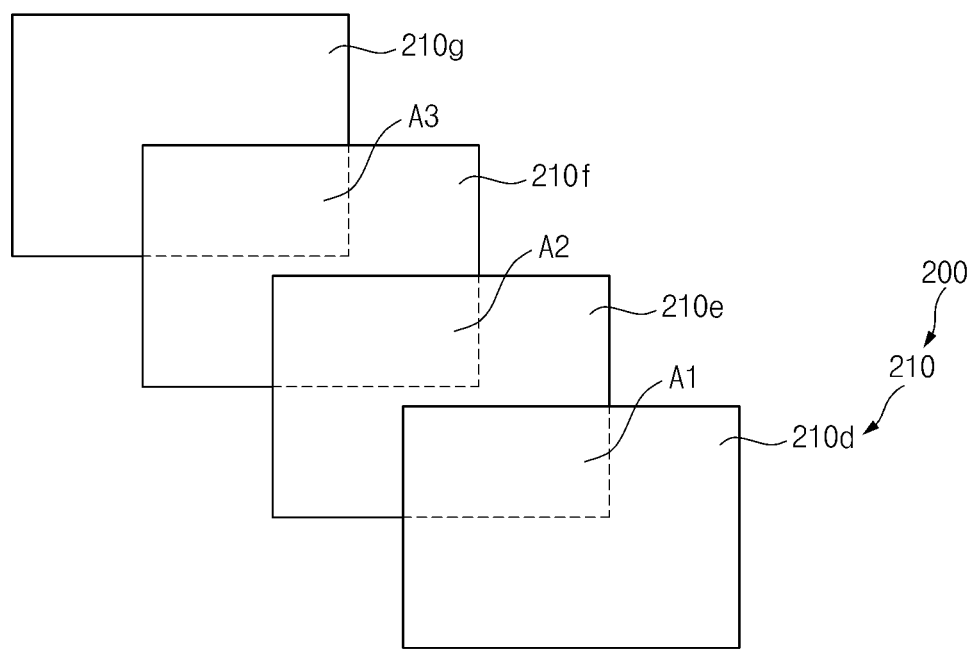
FIG. 13 is a view illustrating a modification of a lamp for a vehicle illustrated in FIG. 11 when viewed from a front side, and is a view schematically illustrating a state, in which a plurality of lens bodies overlap each other.
Figure 14:
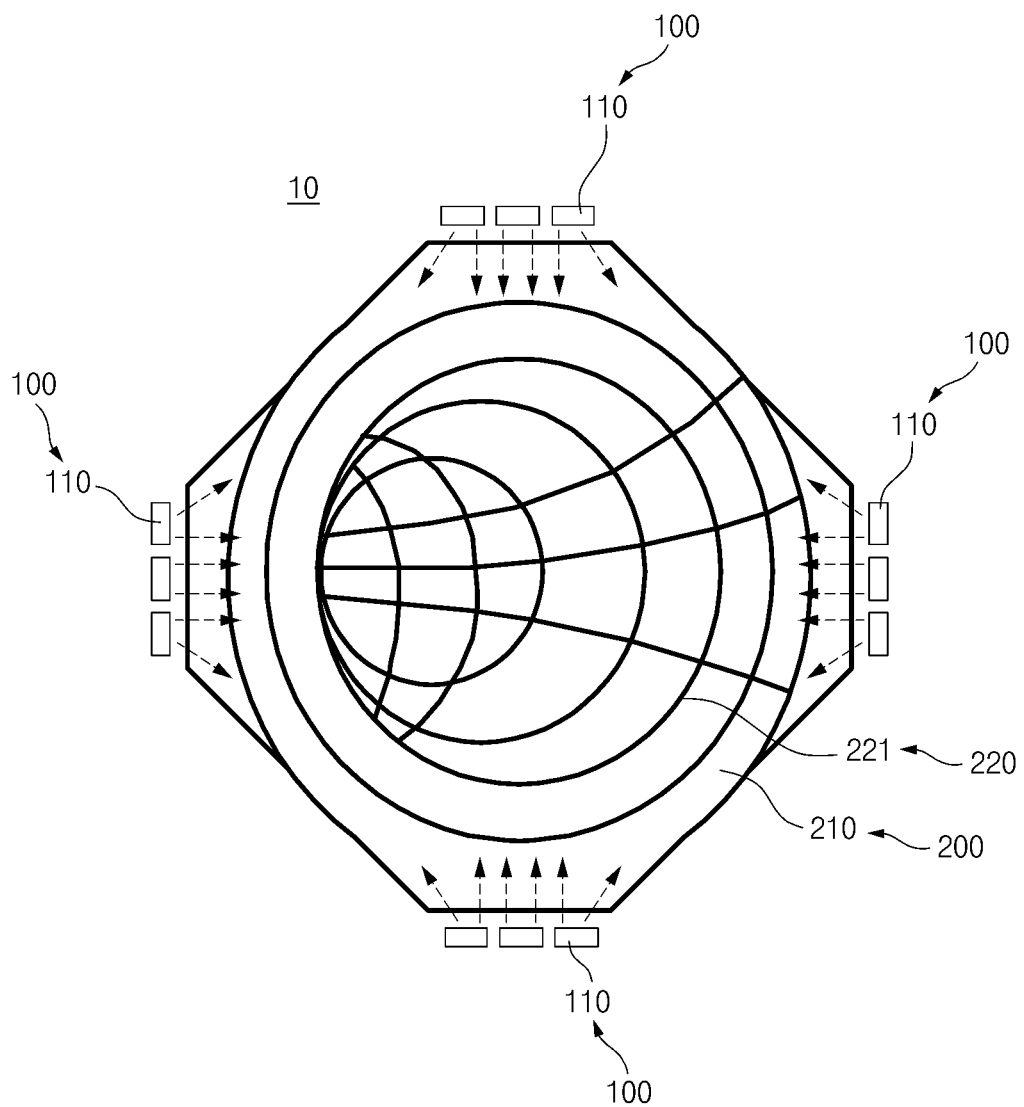
FIG. 14 is a lamp for a vehicle according to an embodiment of the present disclosure, and is a view illustrating an example, in which a plurality of light source parts are provided.

FIG. 9 illustrates a lamp for a vehicle according to another embodiment of the present disclosure, and is a view illustrating an example, in which a 3D pattern is formed in an interior of a lens part. FIG. 10 is a modification of a lamp for a vehicle illustrated in FIG. 9, and is a view illustrating an example, in which locations of a 3D pattern formed in an interior of a lens part in a thickness direction are different. FIG. 11 illustrates a lamp for a vehicle according to another embodiment of the present disclosure, and is a view illustrating an example, in which a plurality of lens bodies overlap each other. FIG. 12 is a modification of a lamp for a vehicle illustrated in FIG. 11, and is a view illustrating an example, in which a plurality of lens bodies are disposed to miss each other. FIG. 13 is a view illustrating a modification of a lamp for a vehicle illustrated in FIG. 11 when viewed from a front side, and is a view schematically illustrating a state, in which a plurality of lens bodies overlap each other. FIG. 14 is a lamp for a vehicle according to an embodiment of the present disclosure, and is a view illustrating an example, in which a plurality of light source parts are provided.

A lamp 10 for a vehicle according to the present disclosure is a lamp for implementing a lighting image having a 3D feeling, and for example, may be a lamp, such as a turn signal lamp, which performs a signal function. However, the lamp 10 for a vehicle according to the present disclosure is not limited thereto, and may be used to implement a 3D image in various kinds of lamps 10 for a vehicle.

Referring to FIGS. 1 to 14, the lamp 10 for a vehicle according to an embodiment of the present disclosure includes a light source part 100 and a lens part 200.

The light source part 100 may be configured to irradiate light, and various elements or devices, which may emit light, may be used. The light source part 100 may include a light source 110 that generates light, and for example, the light source 110 may be a light emitting diode (LED).

The lens part 200 is configured to output light input from the light source part 100 in a forward direction of the lens part 200 toward a front side of the lens part 200, and has a 3D pattern 220 having a specific pattern shape.

Furthermore, the lens part 200 is configured to output the light input from the light source part 100 to the front side when the light reaches the 3D pattern 220. Furthermore, the 3D pattern 220 may be patterned such that a lighting image generated by the light output to a front side of the lens part 200 is implemented as or converted to a 3D image.

In detail, the present disclosure is adapted to implement a lighting image of a 3D shape by irradiating light to the lens part 200, in which the 3D pattern 220 is patterned, and a 3D image may be implemented by the 3D pattern 220 formed in the lens part 200 itself without using a separate special light source, lens, or film.

The light irradiated by the light source part 100 and input to the lens part 200 may travel while totally reflected in an interior of the lens part 200, and then may be output to the front side in an area, in which the 3D pattern 220 is formed (i.e., a 3D pattern area), while not totally reflected further when it reaches the 3D pattern 220. Then, the light that reached the 3D pattern 220 may be output to the rear side as well as to the front side of the lens part 200.

The lens part 200 may include a lens body 210 formed to be flat or curved. Furthermore, the 3D pattern 220 may be patterned in a design that may implement a 3D feeling on a surface or in an interior of the lens body 210.

For example, as in an example illustrated in FIG. 1, the 3D pattern 220 may be designed such that a 3D feeling may be expressed by a plurality of circles when it is viewed from the front side. In detail, the 3D pattern 220 may include a first concentric circle 222 having a concentric relationship, a second concentric circle 223 having a size that is smaller than that of the first concentric circle 222, and one or more inner circles 224 located in an interior of the second concentric circle 223 and inclined to one side. Furthermore, the 3D pattern 220 may include a plurality of first curved parts 225 that are located in an interior of the second concentric circle 223 and connect two points of the second concentric circle 223, and a plurality of second curved parts 226 that extend from one point of the second concentric circle 223 and extend to an outside of the second concentric circle 223 while crossing an interior of the second concentric circle 223. Then, the plurality of first curved parts 225 may have different curvatures to be formed to have a 3D feeling, and the plurality of second curved parts 226 may be formed to become farther away from each other as they go to an outside of the second concentric circle 223 to have a 3D feeling. However, the 3D pattern 220 according to the present disclosure is not limited to the embodiment illustrated in FIG. 1, and a design having a 3D feeling may have various shapes.

Furthermore, for example, referring to FIGS. 2A, 2B, and 3, the 3D pattern 220 may be configured to be designed in a shape having at least one vanishing point when viewed in a rearward direction of the lens part 200 from the front side of the lens part 200, and to give or provide a 3D perspective to the lighting image that is generated as the light is output from the lens part 200. The vanishing point refers to a point, at which lines meet each other when extension lines of an object is drawn by projecting the object in a picture or a blueprint. The perspective method using a vanishing point is used to express a 3D expression on a 2-dimensional (2D) plane.

The present disclosure may allow the lighting image to be implemented as a 3D image of a 3D shape when the lighting is made through the 3D pattern 220 formed in the lens part 200 of a specific thickness, by forming the 3D pattern 220 designed by using the vanishing point and the perspective method in the lens body 210. As an example, for the 3D pattern illustrated in FIG. 2A, each of five hexagons is designed by using a one-point perspective technique having one vanishing point. Furthermore, for the 3D pattern illustrated in FIG. 2B, one hexagon is designed by using a 3-point perspective technique having three vanishing points P1, P2, and P3.

The lamp 10 for a vehicle according to the present disclosure is similar to a general lens when it is not lighted and no 3D feeling is felt, but may implement a 3D lighting image by using the light output through the 3D pattern 220 when it is lighted. That is, the present disclosure may be implemented by a hidden lighting lamp.

The lens part 200 may include the lens body 210, an input surface 230, a front surface 250, and a rear surface 240.

The lens body 210 constitutes a body of the lens part 200 as described above, and may have a specific thickness and may have a shape that is flat (see FIG. 4) or includes a surface curved forwards or rearwards. The lens body 210 may be formed of a transparent material, and for example, may be formed of a material, such as plastic or glass. However, a material of the lens body 210 is not limited thereto, and may be variously modified as long as it is a material that may transmit light.

The input surface 230 may be formed on one side of the lens body 210 and the light may be input from the light source part 100. For example, the input surface 230 may be formed on a side surface that is a surface that is perpendicular to a direction that faces the front side of the lens body 210. Furthermore, the light source part 100 may be disposed in a lateral direction of the lens body 210 to irradiate the light toward the input surface 230. Furthermore, the light source part 100 may include a plurality of light sources 110, and the plurality of light sources 110 may be disposed to be spaced apart from each other along a peripheral circumference of the lens body 210. In this case, the light may be uniformly irradiated from the light source part 100 toward the lens part 200.

The front surface 250 may be formed on a front side of the lens body 210. Furthermore, the rear surface 240 may be formed on a rear side of the lens body 210. The front surface 250 is a surface that faces a direction, in which the light is irradiated through the lamp 10 for a vehicle, and a 3D lighting image may be formed through the light irradiated through the front surface 250. Furthermore, the rear surface 240 is a surface that faces an opposite direction to the front surface 250.

Here, the 3D pattern 220 may be formed on at least one of an interior of the lens body 210, the front surface 250, and the rear surface 240.

The lens part 200 may be configured such that the light input to the lens body 210 is output to the front side toward the front surface 250 in an area, in which the 3D pattern 220 is formed. Furthermore, the lens part 200 may be configured to totally reflect the light in an area of the front surface 250 and the rear surface 240, other than the area, in which the 3D pattern 220 is formed.

In detail, the lens part 200 uses a total reflection principle, and the light input from the light source part 100 to the lens part 200 may travel while totally reflected in the interior of the lens part 200 and may output forwards and rearwards while not being totally reflected further in the area, in which the 3D pattern 220 is formed. That is, the light may be output forwards or rearwards, and here, when the light that faces the rear side may be classified into light output through the rear surface 240 and light that is reflected by the rear surface 240 and faces the front side again. Then, by the light that is directly output to the front side and the light that is output to the front side after being reflected by the rear surface 240, among the light that reached the 3D pattern 220, the lighting image may be implemented as a dual image. Accordingly, a 3D effect may be further spotlighted.

However, the lighting image not always implements the dual image, but may implement a single image or a dual image according to a thickness of the lens body 210, a shape and a location of the 3D pattern 220, and the like.

As described above, the front surface 250 may be divided into a light outputting area and a reflection area.

The light outputting area may correspond to the area, in which the 3D pattern is formed, and may be configured to output the light. Furthermore, the reflection area may include the reflection area that is configured to totally reflect the light to an area other than the light outputting area.

Referring to FIGS. 3 and 4, the 3D pattern 220 may include a plurality of unit patterns 221, and at least one of depths "h" and widths "w" of the plurality of unit patterns 221 may be different.

For example, referring to FIG. 3, the widths "w" and the depth "h" increase as it goes from the vanishing point. Furthermore, for example, intervals "d" between the unit patterns 221 also may be different. Accordingly, a perspective and a depth feeling of the lighting image may be maximized.

The 3D pattern 220 may be formed on the front surface 250 and include an engraved or embossed pattern.

Methods for forming the 3D pattern 220 may include a method for forming the 3D pattern 220 during injection-molding of the lens part 200, and a method for forming the 3D pattern 220 through laser machining after the injection-molding of the lens part 200. In detail, in the method for engraving the 3D pattern 220 during the injection-molding, the 3D pattern 220 may be formed by forming a pattern corresponding to the 3D pattern 220 in an injection mold for forming the lens body 210, engraving or embossing the pattern on the front surface 250 during the injection-molding, and performing a corrosion treatment.

Furthermore, the laser machining method is a method for forming the 3D pattern 220 on the front surface 250 through a laser after the lens body 210 is injection-molded. Then, a depth of the 3D pattern 220 may be adjusted by adjusting a focus of the laser. Here, the part that is formed during the laser machining may be corroded, and thus, the 3D pattern 220 may be formed.

Referring to FIG. 7, the 3D pattern 220 also may include an engraved or embossed pattern on the rear surface 240. Furthermore, the 3D pattern 220 formed on the rear surface 240 may be formed to overlap or miss the 3D pattern 220 formed on the front surface 250 when viewed from the front side. Furthermore, the present disclosure is not limited thereto, and the 3D pattern 220 may be formed only on the rear surface 240.

When the 3D pattern 220 is patterned on both of the front surface 250 and the rear surface 240, the lighting locations on the front surface 250 and the rear surface 240 may be different due to a thickness of the lens body 210, and thus, a 3D feeling of the lighting image may be enhanced.

Meanwhile, referring to FIGS. 5 and 6, the plurality of unit patterns 221 may be formed to be stepped as it goes from a central area to a peripheral area of the lens body 210.

For example, they may be recessed concavely toward the rear side as it goes toward the central area (see FIG. 5), or may be formed to have a shape that protrudes convexly toward the front side. In this case, the lighting image may be implemented 3Dly through the differences of the depths of the plurality of unit patterns 221, and the gradual pattern.

Meanwhile, referring to FIGS. 9 and 10, the 3D pattern 220 may be formed by an empty space defined in the interior of the lens body 210, and may include the plurality of unit patterns 221. In other words, a shape of the 3D pattern 220 may be defined by the empty spaced in the interior of the lens body 210. The depths may be adjusted by forming the 3D pattern 220 in the interior of the lens body 210, whereby the 3D feeling may be enhanced.

Through the laser machining, the 3D pattern 220 may be formed in the interior of the lens body 210. In detail, when a focus is formed in the interior of the lens body 210 by adjusting the location of the focus of the laser during the laser machining, the empty space may be formed in the interior of the lens body 210, and then a corrosion effect may be shown due to the laser machining. Accordingly, the 3D pattern 220 may be formed in the interior of the lens body 210.

Furthermore, referring to FIG. 10, the plurality of unit patterns 221 may be formed at different locations with respect to a thickness direction or rearward direction from the front surface 250 of the lens body 210 to the rear surface 240 of the lens body 210.

For example, as in the illustrated embodiment, the plurality of unit patterns 221 may be configured to be formed at a location that is closer to the front surface 250 as it goes from the central area to the peripheral area of the lens body 210. Furthermore, the plurality of unit patterns 221 may be configured to be formed at a location that is closer to the rear surface 240 as it goes from the central area to the peripheral area of the lens body 210. Accordingly, a depth feeling may be given to the lighting image.

Meanwhile, referring to FIGS. 10 to 13, a plurality of lens bodies 210 may be provided, and the plurality of lens bodies 210 may be arranged in a direction that faces the front side. Furthermore, the light source part 100 may be configured to individually irradiate light toward the plurality of lens bodies 210.

Accordingly, the depth feeling of the lighting image may be enhanced more effectively due to the 3D pattern 220. Furthermore, various images may be implemented or an image conversion effect may be implemented by one lamp 10 for a vehicle, by individually performing the lighting for the plurality of lens bodies 210.

For example, referring to FIG. 11, the plurality of lens bodies 210a, 210b, and 210c may be disposed to overlap each other when viewed from the front side. In this case, adjacent ones of the lens bodies 210a, 210b, and 210c may be spaced apart from each other or contact each other. This is because the depths of the 3D patterns 220 formed in the lens bodies 210a, 210b, and 210c become different due to the thicknesses of the lens bodies 210a, 210b, and 210c.

Furthermore, for example, referring to FIGS. 12 and 13, the plurality of lens bodies 210d, 210e, 210f, and 210g may be disposed to be spaced apart from each other. Furthermore, some areas of adjacent ones of the lens bodies 210*d*, 210*e*, 210*f*, and 210*g* may be disposed to overlap each other when viewed from the front side (see area A1, area A2, and area A2 of FIG. 13).

That is, instead of a scheme, in which the plurality of lens bodies 210*d*, 210*e*, 210*f*, and 210*g*, in which the 3D patterns 220 are formed, overlap each other, they may be disposed in the space to miss each other and such that only some areas may overlap each other. Then, a 3D effect of the lighting image may be further enhanced by the 3D feeling implemented by the 3D pattern 220 and the 3D feeling implemented by the spatial feeling between the lens bodies 210*d*, 210*e*, 210*f*, and 210*g*.

Meanwhile, the input surface 230 may be formed on a side surface of the lens body 210, which is a surface in a direction that is perpendicular to a direction that faces the front side, and the light source part 100 may include the plurality of light sources 110, and may be disposed in a lateral direction of the lens body 210 to irradiate the light toward the input surface 230.

Referring to FIG. 10, the light source part 100 may further include a light guide 130 that guides the light irradiated by the plurality of light sources 110 to the lens part 200. The light guide 130 may guide the light input into an interior of the light guide 130 to the lens part 200 by using internal total reflection. Through the light guide 130, the light may be uniformly input to the lens part 200.

Referring to FIG. 11, the light source part 100 may further include condensing lenses 150 that are disposed the light irradiated by the plurality of light sources 110 and the lens part 200. Through the condensing lenses 150, the light diffused from the light sources 110 may be intensively irradiated to the lens part 200.

The lamp for a vehicle according to the embodiment of the present disclosure may implement the imaging image as the 3D image by the 3D pattern formed in the lens part itself while not using a separate special light source, lens, or film.

Accordingly, according to the embodiment of the present disclosure, a production value of the product may be enhanced and manufacturing costs and the number of components may be reduced by implementing various different 3D images.

Although the specific embodiments of the present disclosure have been described until now, the spirit and scope of the present disclosure are not limited to the specific embodiments, and may be variously corrected and modified by an ordinary person in the art, to which the present disclosure pertains, without changing the essence of the present disclosure claimed in the claims.

What is claimed is:

1. A lamp for a vehicle, comprising:
a light source part configured to irradiate light; and
a lens part configured to receive the light irradiated from the light source part and project, based on the received light, a three-dimensional (3D) image in a forward direction of the lens part, the lens part including a two-dimensional (2D) image pattern expressing a 3D shape and configured to provide a 3D perspective to the 3D image projected from the lens part,
wherein at least one vanishing point of the 3D shape is located within the lens part,
wherein the 2D image pattern includes a plurality of unit patterns, each unit pattern expressing a 3D shape, and
wherein each unit pattern has a depth or width that gradually changes according to a distance of each unit pattern from the vanishing point of the 3D shape.

2. The lamp of claim 1, wherein the lens part includes:
a lens body;
an input surface disposed at a side of the lens body and configured to receive the light irradiated from the light source part;
a front surface disposed at a front side of the lens body; and
wherein at least one of an interior of the lens body, the front surface and the rear surface includes the 2D image pattern.

3. The lamp of claim 2, wherein the lens part is configured to:
output the light input to the lens body from a 2D image pattern area, at which the 2D image pattern is disposed, in the forward direction through the front surface; and
reflect the light at one or more areas of the front and rear surfaces except for the 2D image pattern area.

4. The lamp of claim 3, wherein the front surface includes:
a light outputting area corresponding to the 2D image pattern area and configured to output the light; and
a reflection area configured to reflect the light to an area other than the light outputting area.

5. The lamp of claim 2, wherein the 2D image pattern includes a first pattern disposed at the front surface of the lens part and including a first engraved or embossed pattern.

6. The lamp of claim 5, wherein:
the 2D image pattern further includes a second pattern disposed at the rear surface of the lens part and including a second engraved or embossed pattern, and
the first and second patterns overlap each other.

7. The lamp of claim 5, wherein the 2D image pattern includes a plurality of unit patterns arranged in a step shape, a concave shape or a convex shape.

8. The lamp of claim 7, wherein the plurality of unit patterns are disposed closer to the front surface or rear surface of the lens body.

9. The lamp of claim 2, wherein the 2D image pattern includes a plurality of unit patterns.

10. The lamp of claim 9, wherein the plurality of unit patterns is disposed respectively at a plurality of different locations with respect to a rearward direction from the front surface of the lens body to the rear surface of the lens body.

11. The lamp of claim 2, wherein:
the lens body comprises a plurality of lens bodies arranged in the forward direction of the lens body, and
the light source part is configured to irradiate the light toward the plurality of lens bodies.

12. The lamp of claim 11, wherein at least some of the lens bodies overlap each other.

13. The lamp of claim 12, wherein:
the lens bodies are spaced apart from each other, and
the lens bodies disposed adjacent to each other overlap each other.

14. The lamp of claim 2, wherein:
the input surface is disposed at a side surface of the lens body facing in a direction perpendicular to the forward direction of the lens part, and
the light source part includes a plurality of light sources disposed in a lateral direction of the lens body and configured to irradiate the light toward the input surface of the lens part.

15. The lamp of claim 14, wherein the light source part further includes a light guide configured to guide the light irradiated by the plurality of light sources to the lens part.

16. The lamp of claim 14, wherein the light source part further includes a plurality of condensing lenses disposed between the plurality of light sources and the lens part.

\* \* \* \* \*